(12) United States Patent
Chua-Eoan

(10) Patent No.: US 8,924,902 B2
(45) Date of Patent: Dec. 30, 2014

(54) METHODS AND CIRCUITS FOR OPTIMIZING PERFORMANCE AND POWER CONSUMPTION IN A DESIGN AND CIRCUIT EMPLOYING LOWER THRESHOLD VOLTAGE (LVT) DEVICES

(75) Inventor: Lew G. Chua-Eoan, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 12/683,075

(22) Filed: Jan. 6, 2010

(65) Prior Publication Data

US 2011/0163801 A1 Jul. 7, 2011

(51) Int. Cl.
*G06F 17/50* (2006.01)
(52) U.S. Cl.
CPC ........ *G06F 17/5068* (2013.01); *G06F 2217/84* (2013.01); *G06F 2217/78* (2013.01)
USPC ........... 716/106; 716/100; 716/104; 716/113; 716/120; 716/132
(58) Field of Classification Search
CPC ............ G06F 17/5045; G06F 2217/78; G06F 17/505; G06F 17/5068; G06F 11/085
USPC ......... 716/100, 102, 104, 113, 119, 120, 132, 716/133; 326/31, 35, 38
See application file for complete search history.

(56) References Cited

U.S. PATENT DOCUMENTS

| | | | | |
|---|---|---|---|---|
| 6,498,762 B2 * | 12/2002 | Noda et al. | ..................... | 365/227 |
| 6,934,923 B2 * | 8/2005 | Oodaira et al. | ................ | 716/104 |
| 7,129,741 B2 * | 10/2006 | Katoh et al. | ..................... | 326/35 |
| 7,145,806 B2 * | 12/2006 | Kawai | ....................... | 365/185.25 |
| 7,167,052 B2 * | 1/2007 | Heightley et al. | ............. | 330/261 |
| 7,207,022 B2 * | 4/2007 | Okudaira | ....................... | 716/113 |
| 7,301,378 B2 * | 11/2007 | Cao | ................. | 327/158 |
| 7,340,712 B2 * | 3/2008 | Correale | ....................... | 716/102 |
| 7,417,482 B2 * | 8/2008 | Elgebaly et al. | .............. | 327/278 |
| 7,500,207 B2 * | 3/2009 | Bhattacharya et al. | ....... | 716/100 |
| 7,652,333 B2 * | 1/2010 | Ozawa et al. | ................. | 257/368 |
| 7,653,885 B2 * | 1/2010 | Nandy et al. | .................. | 716/133 |

(Continued)

OTHER PUBLICATIONS

Anis et al.; "Design and optimization of multithreshold CMOS (MTCMOS) circuits"; Publication Year: 2003; Computer-Aided Design of Integrated Circuits and Systems, IEEE Transactions on; vol. 22 , Issue: 10; pp. 1324-1342.*

(Continued)

*Primary Examiner* — Helen Rossoshek
(74) *Attorney, Agent, or Firm* — Peter Michael Kamarchik; Nicholas J. Pauley; Joseph Agusta

(57) ABSTRACT

Methods and circuits for optimizing performance and power consumption in a circuit design and circuit employing one or more lower threshold voltage (Lvt) cells or devices are described. A base supply voltage amplitude is determined for providing operating power for the circuit. The base supply voltage amplitude is a low or lowest voltage level that still satisfies a performance specification for the circuit. Providing a low or lowest base supply voltage level reduces or minimizes the standby (i.e., non-switching) power consumption in the Lvt device(s) since current leakage is reduced as the supply voltage level is reduced. Reducing the supply voltage level used to power the Lvt device(s) also reduces active power consumption for the circuit as well. Thus, total power consumption is optimized or reduced while still receiving the benefit of using Lvt devices to optimize or increase performance of a circuit layout and circuit.

32 Claims, 11 Drawing Sheets

(56) References Cited

U.S. PATENT DOCUMENTS

| | | | |
|---|---|---|---|
| 7,716,618 B2* | 5/2010 | Ferrari et al. | 716/119 |
| 7,884,640 B2* | 2/2011 | Greene et al. | 326/38 |
| 7,895,551 B2* | 2/2011 | Shah et al. | 716/100 |
| 7,907,438 B2* | 3/2011 | Sumita | 365/154 |
| 7,961,502 B2* | 6/2011 | Chua-Eoan | 365/158 |
| 7,996,810 B2* | 8/2011 | Bernstein et al. | 716/133 |
| 8,161,431 B2* | 4/2012 | Buonpane et al. | 716/100 |
| 8,286,112 B2* | 10/2012 | Miranda et al. | 716/110 |
| 2005/0144576 A1* | 6/2005 | Furuta et al. | 716/4 |
| 2006/0273821 A1* | 12/2006 | Correale | 326/31 |
| 2008/0320420 A1* | 12/2008 | Sferrazza | 716/2 |
| 2009/0146734 A1* | 6/2009 | Fallah et al. | 327/544 |
| 2009/0224356 A1 | 9/2009 | Chandra | |
| 2010/0070933 A1* | 3/2010 | Quach | 716/2 |
| 2010/0165705 A1* | 7/2010 | Sumita | 365/154 |
| 2011/0095802 A1* | 4/2011 | Horikoshi et al. | 327/276 |
| 2011/0246959 A1* | 10/2011 | Tang et al. | 716/127 |
| 2012/0020157 A1* | 1/2012 | Lee et al. | 365/185.05 |

OTHER PUBLICATIONS

Markovic et al.; "Ultralow-Power Design in Near-Threshold Region"; Publication Year: 2010; Proceedings of the IEEE; vol. 98, Issue: 2; pp. 237-252.*

Hu et al.; "Near-threshold full adders for ultra low-power applications"; Publication Year: 2010; Circuits,Communications and System (PACCS), 2010 Second Pacific-Asia Conference on; vol. 1; pp. 300-303.*

Hemantha et al.; "Multi-threshold CMOS design for low power digital circuits"; Publication Year: 2008; TENCON 2008—2008 IEEE Region 10 Conference; pp. 1-5.*

Calhoun B.H., et al., "Ultra-dynamic Voltage scaling (UDVS) using sub-threshold operation and local Voltage dithering", IEEE Journal of Solid-State Circuits, IEEE Service Center, Piscataway, NJ, USA, vol. 41, No. 1, Jan. 1, 2006, pp. 238-245, XP002461237, ISSN: 0018-9200, DOI : DOI:10.1109/JSSC.2005.859886.

Gerousis V ED.,"Design and modeling challenges for 90 NM and 50 NM", Institute of Electrical and Electronics Engineers, Proceedings of the IEEE 2003 Custom Integrated Circuits Conference. (CICC 2003), San Jose, CA, Sep. 21-24, 2003; [IEEE Custom Integrated C i rcuits Conference.CICC1, New York, NY: IEEE, US, vol. CONF. 25, Sep. 21, 2003, pp. 353-360, XP010671232, DOI : DOI:10.1109/CICC.2003.1249417 ISBN: 978-0-7803-7842-1 p. 353 p. 357-p. 358.

Gonzalez R., et al., "Supply and Threshold Voltage Scaling for Low Power CMOS", IEEE Journal of Solid-State Circuits, IEEE Service Center, Piscataway, NJ, USA, vol. 32, No. 8, Aug. 1, 1997, XP011060535, ISSN: 0018-9200.

International Search Report—PCT/US2011/020320—ISA/EPO—Jun. 21, 2011.

Li Y., et al.,"Design optimization for an 8-bit microcontroller in wireless biomedical sensors", Biomedical Circuits and Systems Conference, 2009, BIOCAS 2009, IEEE, IEEE, Piscataway, NJ, USA, Nov. 26, 2009, pp. 33-36, XP031595015, ISBN: 978-1-4244-4917-0.

Taiwan Search Report—TW100100529—TIPO—Oct. 14, 2013.

* cited by examiner

METHODS AND CIRCUITS FOR OPTIMIZING PERFORMANCE AND POWER CONSUMPTION IN A DESIGN AND CIRCUIT EMPLOYING LOWER THRESHOLD VOLTAGE (LVT) DEVICES

BACKGROUND

I. Field of the Disclosure

The technology of the present application relates generally to cell-based designs and circuits incorporating use of lower threshold voltage (Vt) ("Lvt") devices and related methodologies to increase performance and reduce power consumption in a circuit.

II. Background

Semiconductor technology has evolved into using deep sub-micron geometries. Deep sub-micron geometries are generally those less than one-hundred (100) nanometers. Using deep sub-micron semiconductor devices (also called "sub-micron devices") allows integration of more complex functionality into a smaller area. For example, sub-micron device technologies are used to produce complex system-on-a-chip (SOC) designs where size constraints are limiting. SOC designs may be used in portable devices, including but not limited to cellular phones, personal digital assistants (PDAs), laptop computers, other electronic devices, and the like, where size constraints are limiting.

Use of sub-micron devices is also advantageous because their smaller transistor channel lengths allow smaller cell areas and provide faster switching times. Faster switching times provide increased performance or speed. However, use of sub-micron devices comes with a tradeoff. Because of smaller transistor channel lengths in sub-micron devices, current continues to flow even during standby (i.e., non-switching) states due to "sub-threshold conduction." Sub-threshold conduction leads to current leakage. When a gate-to-source voltage (Vgs) of a sub-micron gate is lower than its threshold voltage (Vt), it is in the sub-threshold region. The drain current reduces logarithmically with a reduction in Vgs until the device is completely turned off, such as in a standby state (i.e., Vgs=0). Semiconductor devices above sub-micron levels have higher Vts such that drain current is insignificant when the device is not activated or in a standby state. However, when Vt is lowered, as is the case in sub-micron devices, drain current becomes significant even when the device is not activated or in a standby state. Significant drain current results in significant leakage current and increased total power consumption since total power consumption is comprised of standby power consumption and active power consumption. Leakage current in sub-micron devices can be further exacerbated by use of very thin gate oxides in sub-micron devices. This may be of particular concern when employing sub-micron devices in portable devices or other devices that use battery power. Increased power consumption results in quicker battery drain and shorter battery life. Thus, increased power consumption due to leakage must be taken into consideration along with increased circuit performance when employing sub-micron devices.

To counter the issue of increased power consumption due to leakage current in sub-micron devices, manufacturers have created sub-micron devices with higher Vts. For example, higher Vt (Hvt) devices exhibit lower current leakage over lower Vt (Lvt) devices. For example, Hvt devices may exhibit sub-threshold leakage currents of approximately 1.0 nano-Amperes per micrometer (nA/µm). Lvt devices may exhibit sub-threshold leakage currents of approximately 10.0 nano-Amperes per micrometer (nA/µm), approximately ten times more than Hvt devices. However, circuit performance can be adversely affected by use of Hvt devices. Hvt devices have slower switching times than Lvt devices, but have lower leakage current as compared to nominal Vt (Nvt) devices. Lvt devices have faster switching times than Hvt devices, but higher leakage current as compared to Nvt devices.

To address the need for both increased performance and reduced power consumption that typically cannot be achieved by sole use of either Lvt devices or Hvt devices, circuits can be designed to employ mixed use of Lvt and Hvt devices. Lvt devices can be used in one or more critical speed paths to achieve desired performance. However, use of the Lvt devices increases power consumption of the circuit during standby modes due to sub-threshold conduction. To reduce power consumption during standby modes without affecting circuit performance, the non-critical speed paths can employ Hvt devices. However, even with the use of Lvt devices only in the critical paths of a circuit, standby power consumption may still be unacceptable. Replacing the Lvt devices with Hvt devices may not be possible without violating a minimum desired circuit performance.

SUMMARY OF THE DISCLOSURE

Embodiments disclosed in the detailed description include methods and circuits for optimizing performance and power consumption in a circuit design and circuit employing lower threshold voltage (Vt) ("Lvt") cells and devices. The circuit layout and circuit employ one or more lower Vt (Lvt) cells. Lvt cells are employed to increase performance (i.e., speed) of the circuit. However, Lvt cells have higher current leakage profiles as compared to nominal Vt (Nvt) and higher Vt (Hvt) cells, which leads to increased power consumption. To receive the benefit of Lvt cell performance while reducing or minimizing the tradeoff of higher leakage current in Lvt cells, a base supply voltage level is determined for providing operating power for the circuit to increase or optimize performance and decrease or optimize standby power consumption. The base supply voltage level is a low or lowest voltage level that still satisfies a target performance for the circuit. Providing a low or lowest base supply voltage level reduces or minimizes the standby (i.e., non-switching) power consumption in the Lvt cell(s) since current leakage is reduced as supply voltage level is reduced. Reducing the supply voltage level used to power the Lvt cell(s) also has the benefit of reducing active power consumption as well. Thus, total power consumption is optimized or reduced while still receiving the benefit of using Lvt cells to optimize or increase performance of a circuit design and circuit.

In the embodiments disclosed herein, a method for using lower Vt cells in a circuit design and circuit is provided. The method includes determining target operating specifications for a circuit. These operating specifications can include performance (or delay), leakage, and/or operating temperature, as examples. A design layout of the circuit is formed by employing one or more Lvt cells. Next, the circuit design and physical build are synthesized. One or more critical speed paths for the circuit are determined to determine the delay (i.e., performance) of the circuit. A base supply voltage amplitude is then determined for providing power as a function of the delay of the circuit using a delay-supply voltage profile for the Lvt cell(s). The base supply voltage amplitude is selected to provide a low or lowest supply voltage to the Lvt cell(s) to optimize or reduce power consumption while still allowing the circuit to meet the target operating speed. If required to reduce leakage specifications, one or more Nvt or Hvt devices may be employed in the circuit and may replace one or more of the Lvt devices. The Nvt or Hvt devices may be employed to replace Lvt devices in non-critical paths (CPs) such that performance of the CPs in the circuit not be affected. After the circuit design is closed, a base supply voltage rail is then provided in the physical layout of the circuit design and circuit and is configured to supply the base supply voltage level at the base supply voltage amplitude from a base voltage supply to provide power to the Lvt cell device(s).

Other embodiments include methods and techniques for further optimizing performance and power consumption. For example, dynamic voltage scaling (DVS), dynamic frequency scaling (DFS), or dynamic voltage and frequency scaling (DVFS) may be further employed to increase performance or reduce total power consumption. These techniques may be used to increase performance by increasing or scaling-up the voltage level of the base voltage supply or the clock of the circuit during hyper-performance modes. The tradeoff may be higher active power consumption, but the active power consumption can be less than it otherwise would have been by providing the low or lowest base supply voltage level to power the circuit using the techniques disclosed herein. A reduction in operating voltage provided by the embodiments disclosed herein has the additional benefit of reducing active power as well, since a reduction in voltage results in quadratic reduction of active power. These techniques may also be used to reduce power consumption by decreasing or scaling-down the voltage level of the base voltage supply during power consumption modes in either active or standby modes. The tradeoff will be lower performance, which may be acceptable in power consumption modes.

Further, in other embodiments disclosed herein, a split power grid is provided comprised of two or more power grids. Each power grid can employ one or more independent voltage supplies. The voltage supplies can be designed and used to provide operating power independently of each other to different cells in the circuit layout and circuit. One voltage supply is the base voltage supply for providing a low or lowest base supply voltage level for operating a Lvt cell(s) to optimize performance and power consumption. The base supply voltage level produced by the base voltage supply can be scaled using DVS or DVFS, if desired. A second voltage supply can be provided to supply a second supply voltage level for independently operating any cells, such as memory cells for example, that require a minimum supply voltage level. In this manner, any scaling employed in the circuit layout and circuit either during standby or active modes to the base supply voltage level will not affect cells powered by the second voltage supply.

DETAILED DESCRIPTION

Figure 1:
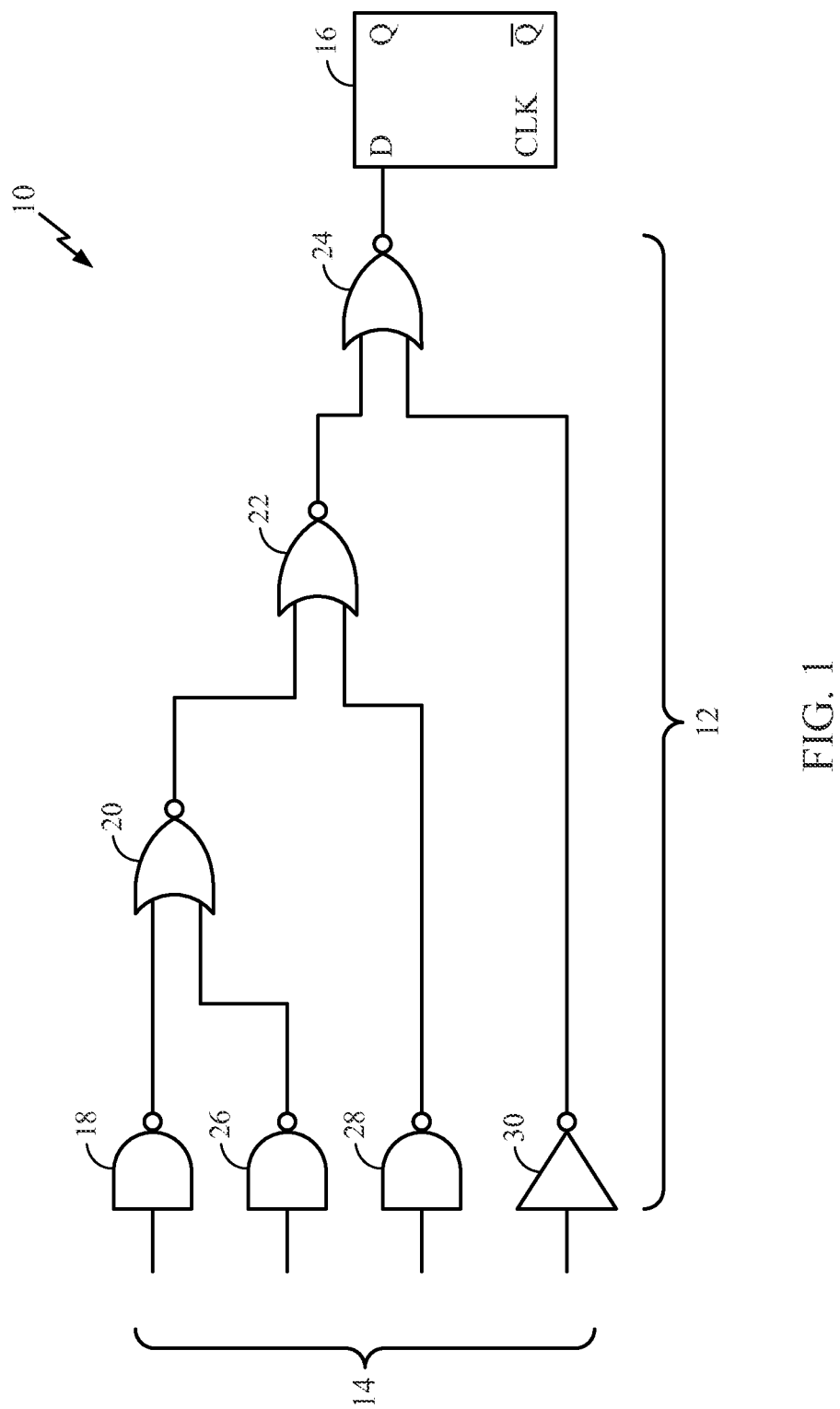
FIG. 1 is a diagram of an exemplary circuit in which multi-threshold voltage (Vt) ("multi Vt") cell-based devices may be employed.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods and circuits for optimizing performance and power consumption in a circuit design and circuit employing lower threshold voltage (Vt) ("Lvt") cells and devices. The circuit layout and circuit employ one or more Lvt cells. Lvt cells are employed to increase performance (i.e., speed) of the circuit. However, Lvt cells have higher current leakage profiles as compared to nominal Vt (Nvt) and higher Vt (Hvt) cells, which leads to increased power consumption. To receive the benefit of Lvt cell performance while reducing or minimizing the tradeoff of higher leakage current in Lvt cells, a base supply voltage level is determined for providing operating power for the circuit to increase or optimize performance and decrease or optimize standby power consumption. The base supply voltage level is a low or lowest voltage level that still satisfies a target performance for the circuit. Providing a low or lowest base supply voltage level reduces or minimizes the standby (i.e., non-switching) power consumption in the Lvt cell(s) since current leakage is reduced as supply voltage level is reduced. Reducing the supply voltage level used to power the Lvt cell(s) also has the benefit of reducing active power consumption as well. Thus, total power consumption is optimized or reduced while still receiving the benefit of using Lvt cells to optimize or increase performance of a circuit design and circuit.

FIG. 1 illustrates an exemplary typical circuit 10 in which the multi Vt cell and device methodologies and circuits disclosed herein may be applied. As illustrated, a series of gates 12 are provided to process incoming signals 14. The processed signals converge into an input of a D flip-flop 16. To achieve the highest performance possible in the circuit 10 (i.e., the lowest propagation delay), one could simply employ Lvt cells for all the gates 12 in the circuit 10. Lvt cells have smaller transistor channel lengths and thus provide faster switching times and increased performance as a result. However, employing Lvt cells also increases standby power consumption (i.e., dissipation) by the circuit 10, which may be unacceptable. Thus, total power consumption will be higher than if Hvt cells were employed since total power consumption is a function of standby power consumption. During standby modes, current still continues to flow through the transistor in Lvt cells due to "sub-threshold conduction." Sub-threshold conduction leads to current leakage. Current leakage is significantly larger in Lvt cells than in Hvt cells, meaning that total power consumption is increased when using an Lvt cell in place of an Hvt cell. However, Lvt cells switch faster than Hvt cells, allowing for higher circuit performance.

To achieve a tradeoff between performance and power consumption, mixed use of Hvt cells and Lvt cells may be employed. Using the circuit 10 in FIG. 1 as an example, there are various signal paths in the gates 12. The clock rating of the circuit 10 is determined by the longest signal path, which is also known as the "critical path" (CP). In the circuit 10, there are four signal paths to consider. The first signal path is made up by cells 18, 20, 22, and 24. The second signal path is made up by cells 26, 20, 22, 24. The third signal path is made up by cells 28, 22, and 24. The fourth signal path is made up by cells 30 and 24. If the four signal paths utilize the same cell types with the same propagation delay per cell, the first and second signal paths will incur the largest propagation delay. The fourth signal path will incur the shortest propagation delay. Thus, the first and second signal paths are the CPs.

Figure 2:
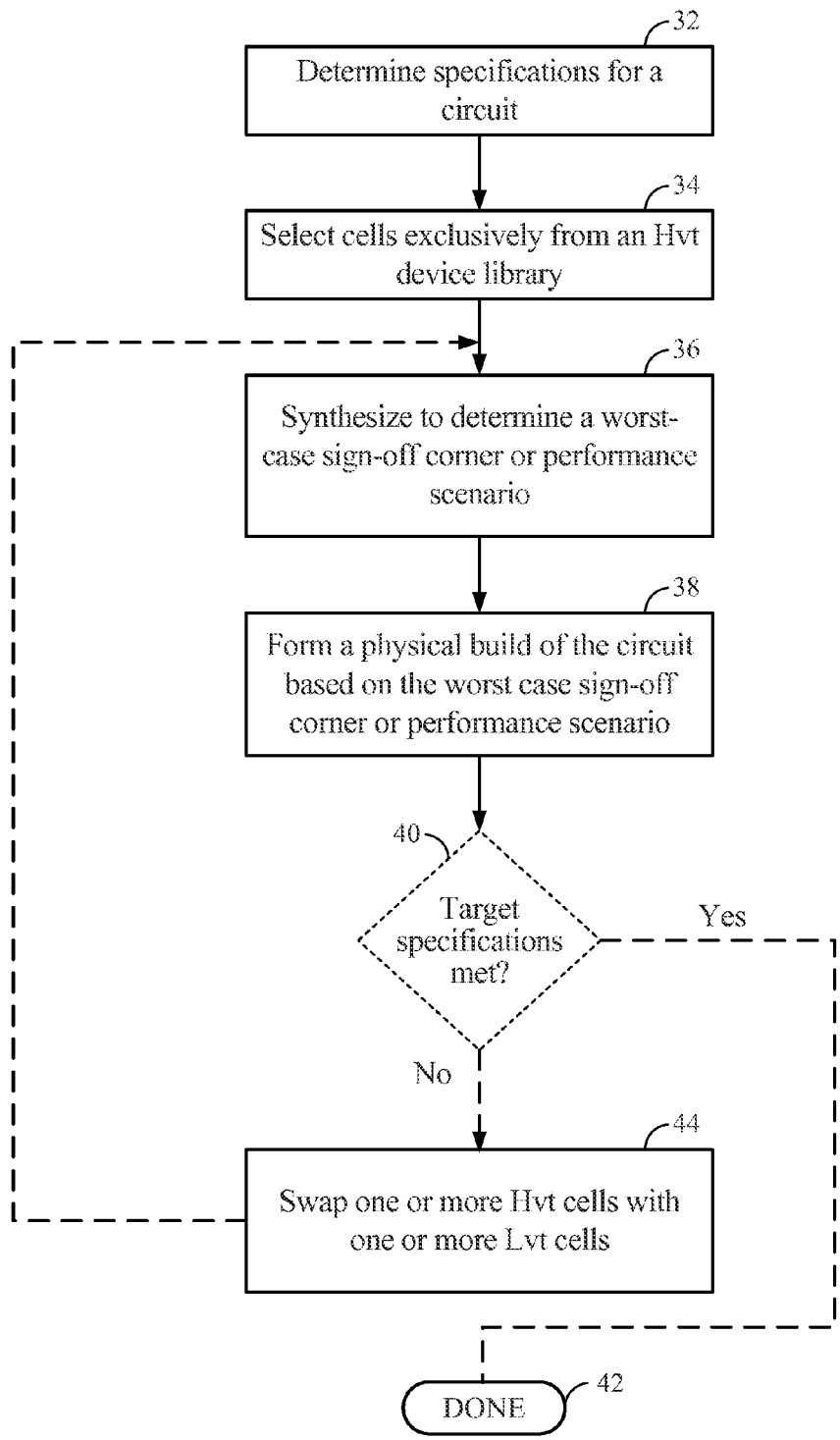
FIG. 2 is a flowchart illustrating an exemplary process for providing a design and physical layout for a circuit or functional block employing one or more higher Vt (Hvt) devices.

The circuit 10 and its various cells in FIG. 1 may have been designed according to the process in FIG. 2 to achieve a specification for particular timing, power consumption, and/or area on a semiconductor die (block 32, FIG. 2). To minimize current leakage, the cells may have initially been selected exclusively from an Hvt device library (block 34, FIG. 2) and synthesized to determine the worst case sign-off corner or performance (i.e., speed) scenario (block 36, FIG. 2). An Hvt cell or device is defined as having a higher threshold voltage as compared to a nominal Vt cell or device, and thus will correspondingly have lower leakage than a nominal Vt device. The physical build of the circuit 10 is then formed based on the worst case sign-off corner of the circuit 10 (block 38, FIG. 2). Any operating voltage level that is sufficient to power the Hvt devices in the circuit 10 can be employed. If target specifications for the circuit 10 require an increase in performance from the performance according to the exclusive Hvt cell design, before closing the design (block 40, FIG. 2) and finishing the design process (block 42, FIG. 2), one or more Hvt cells can be swapped with one or more Lvt cells (block 44, FIG. 2). An Lvt cell or device is defined as having a lower threshold voltage as compared to a nominal Vt cell or device, and thus will have a faster turn on time than a nominal Vt device. As a result, the performance of the CPs may be increased. However, Lvt cells also have higher leakage versus Nvt devices, thus increasing leakage power consumption when employed in the circuit 10. Thus, the leakage power consumed by the circuit 10 may still be unacceptable or beyond requirements or design limits to achieve the increase in performance.

In this regard, a method for initially using Lvt cells in a circuit design and circuit is provided. The method allows optimization of performance and power consumption (i.e., dissipation) in a circuit design and circuit. This method may also be employed for a functional circuit block or group of functional circuit blocks. The methodology can be employed to design, use, or operate a cell-based circuit, including but not limited to the circuit 10 in FIG. 1, as an example. One embodiment of the method is provided in the flowchart illustrated in FIG. 3. As provided therein, circuit design and implementation typically involves achieving certain specifications. Thus, the first task includes determining target specifications for a circuit (block 46). The target specifications for the circuit may include performance or delay specification of the circuit, a power budget for power consumption by the circuit, and size allocated for the circuit on a semiconductor die. Further, these target specifications may be determined for one or more operating temperatures for the circuit. These specifications govern the types of cells selected for a circuit layout.

After the target specifications are determined, the design of the circuit is initially formed by exclusively using Lvt cells or devices in the design (block 48). Lvt cells or devices are selected to maximize performance (i.e., minimize delay) of the circuit. Lvt devices may be employed in all cells of the circuit design or may be employed only in the CPs of the circuit design. Nvt devices may be employed in the non-CPs of the circuit to reduce leakage power without affecting performance of the CPs. Thereafter, the circuit design is synthesized based on one or more corner selections from the design (block 50).

At this point, the circuit design may include optimal performance, but not acceptable leakage power consumption. However, it is desired to optimize both performance and power consumption of the circuit. To accomplish this, the design is synthesized according to the worst case sign-off corner(s) of the circuit design (block 52). One or more CPs for the circuit and the resulting delays of each are determined based on a given voltage supply level powering the circuit to determine the performance of the circuit (block 52A). To determine if the power consumption can be further optimized, it is determined if a lower operating voltage amplitude for powering the circuit can be provided to lower leakage without degrading performance beyond specifications (block 52B). In prior methods, a base supply voltage amplitude is not determined. Determining a base supply voltage amplitude involves selecting the low or lowest base supply voltage amplitude to reduce or minimize leakage current in the Lvt cells of the circuit for a given or maximum acceptable delay in the circuit so that target operating speed specifications are still met or exceeded while leakage current is lowered. As previously discussed, leakage current in Lvt cells is reduced as a result of lowering the supply voltage level provided to supply power to the Lvt cells. Thus, determining and providing a voltage level at the base supply voltage amplitude in a circuit layout and circuit can reduce power consumption of the Lvt cells. However, the base supply voltage amplitude should not be lowered to a point that the delay in the circuit exceeds the target operating speed. Lowering the supply voltage level in an Lvt cell increases its propagation delay.

To determine the base supply voltage amplitude to reduce leakage while not violating performance or delay specifications, a delay-supply voltage profile can be employed based on the exclusive Lvt cell use in the circuit (block 52B) according to the determined delay of one or more CPs of the circuit (from block 52A). FIGS. 4-6 illustrate exemplary delay-supply voltage profiles for Lvt, Nvt, and Hvt devices that can be used to make the determination of the low or lowest base supply voltage amplitude for the circuit (e.g., block 52B in FIG. 3) to optimize both performance and power consumption of a circuit. The exemplary delay-supply voltage profiles illustrated in FIGS. 4-6 were determined by analyzing, at various operating voltages, the CP performance of the physical circuit built according to a design process of the initial Hvt device use in a circuit (blocks 32-38, FIG. 2, and blocks 54-56 in FIG. 3), Nvt device use in the circuit (block 56 in FIG. 3), and Lvt device use in the circuit design (blocks 46-50, FIG. 3).

In this regard, FIG. 4 illustrates an exemplary delay-supply voltage profile 68 plotting delay for given supply voltage levels at a nominal temperature for the use of Lvt, Nvt, and Hvt devices in the circuit. As illustrated, the delay-supply voltage profile 68 contains two axes. A supply voltage level (Vdd) axis 70 is provided in the x-axis for a range of supply voltage levels between 0.80 and 1.20 Volts. A delay axis 72 showing normalized delay is provided in the y-axis against the supply voltage levels in the supply voltage level axis 70. Thus, in this delay-supply voltage profile 68, the resulting normalized delay from the selection of a given supply of voltage levels is shown for comparison purposes. Three curves are plotted in the graph for illustration purposes; however, the data in these curves may be mathematically represented by data points or other techniques. The first curve is a delay-supply voltage curve 74 for an Hvt device. As illustrated, the propagation delay for the Hvt device is approximately 1.85 in normalized time units and is essentially constant over the range of supply voltage levels. Second and third delay-supply voltage curves 76, 78 for Nvt and Lvt devices, respectively, are also plotted in the delay-supply voltage profile 68. The delay-supply voltage curve 76 is for an Nvt device. The delay-supply voltage curve 78 is for an Lvt device. As illustrated, the propagation delays for the Lvt and Nvt devices are not constant over the supply voltage level range. As the supply voltage level (Vdd) is lowered, delay increases for both the Lvt and Nvt devices at the nominal operating temperature, but leakage current lowers.

As previously discussed, it is desired to determine and provide a base supply voltage amplitude for providing a base voltage supply level for the circuit that is a lower or lowest voltage level to reduce leakage current in Lvt devices while still meeting performance specifications. The individual delay-supply voltage profiles 74, 76, 78 for the various Vt devices in the delay-supply voltage profile 68 can be used to make this determination. Specifically, the delay-supply voltage profile 68 can be used to determine how much the operating voltage level (Vdd) for the circuit design can be lowered while still achieving acceptable performance or delay according to specifications. For example, the Lvt delay-supply voltage curve 78 in FIG. 4 illustrates that Vdd can be lowered to approximately 0.93 Volts (V) for Lvt devices to achieve the same performance or delay as an Hvt device at a higher Vdd. Lowering the operating voltage level will lower performance and leakage current in an Lvt device, but can be selected to be the lower or lowest level such that performance specifications are still met with the benefit of lower leakage. As a result of lowering Vdd, leakage current is reduced thus achieving optimal performance and leakage power when using Lvt devices in a circuit design. The delay-supply voltage profile 68 can also be used to choose between different Nvt and/or Lvt cells and devices to employ in a circuit layout and circuit. For example, as illustrated in FIG. 4, a lower base supply voltage amplitude can be provided if an Lvt device is used as opposed to an Nvt device for a given delay.

Turning back to FIG. 3, the base supply voltage amplitude is determined and lowered, if possible, and the resulting delays for the various Vt devices are used to determine the worst case sign-off corners in a physical build of the circuit (block 58). However, the base supply voltage amplitude should not be lowered such that the resulting increase in propagation delay causes the operating speed of the circuit to not meet the target operating speed. Ideally, though not required, the base supply voltage amplitude should be lowered to the lowest possible voltage such that the resulting delays from the delay-supply voltage profiles for the Vt devices used in the circuit allow for a set of CPs that still satisfy the target operating speed. Further, because a circuit may employ different types of Lvt cells, each having their own delay-supply voltage profiles, the base supply voltage amplitude may be higher than it otherwise could be if the choice of Lvt cells in the layout is altered. For example, the delay-supply voltage profile 68 of FIG. 4 shows that the propagation delay for an Nvt cell is higher than for an Lvt cell at all supply voltage ranges illustrated.

In summary, the illustrated method involves selecting a low or lowest base supply voltage amplitude for powering one or more Lvt devices to reduce or minimize leakage current, but such that the resulting propagation delays, as determined from a delay-supply voltage profile, do not violate the performance specifications for the circuit. Providing a low or lowest base supply voltage amplitude for a circuit employing Lvt cells may allow achievement of target operating speed and power consumption requirements that may not otherwise be possible.

Another advantage of selecting a low or lowest base supply voltage amplitude for providing the supply voltage level for Vt cells in a circuit is that active or dynamic power consumption is also lowered. Switching power during active modes for devices is governed by the equation:

$$CV^2 f,$$

where C equals capacitance, V equals supply voltage, and f equals frequency. Switching power consumption decreases quadratically for a given decrease in supply voltage level. Thus, both standby and active power are reduced by lowering the voltage amplitude of the voltage supply providing power to cells in a circuit, reducing the total power consumption of the circuit. Further, reducing the size of the Vt cells can reduce capacitance (C) and thus active power as well.

It may be desirable to analyze a circuit design based on temperatures other than nominal operating temperature to determine the base supply voltage amplitude. FIGS. 5 and 6 illustrate delay-supply voltage profiles for the same Vt devices provided in FIG. 4, except at different operating temperatures. The base supply voltage amplitude ideally should be, but is not required to be, selected on delay propagation over the operating temperature ranges expected by the circuit to ensure that the target operating speed of the circuit is satisfied at its designed or specified temperature operating range.

FIG. 5 illustrates an exemplary delay-supply voltage profile 68' plotting delay for given supply voltage levels for Lvt, Nvt, and Hvt devices at a lower operating temperature than nominal operating temperature. The same types of axes and curves are illustrated in FIG. 5 as provided in FIG. 4, but are shown with appended element numbers (') to signify that the axes and curve data are for a different operating temperature. Just as illustrated in the delay-supply voltage profiles in FIG. 4, the delay-supply voltage profiles in FIG. 5 illustrate that lowering the supply voltage amplitude for the Lvt devices increases propagation delay even though leakage current is reduced. However, as illustrated in FIG. 5, the propagation delays for the Vt cells are greater than at nominal temperature, as illustrated in FIG. 4, for a given supply voltage. Thus, if it is desired for the circuit to meet the target operating speed at the lower operating temperature, the base supply voltage amplitude selected needs to be based on the delay-supply voltage profile that yields the greatest propagation delays, which is the delay-supply voltage profiles at the lower operating temperature thus far.

FIG. 6 illustrates an exemplary delay-supply voltage profile 68" plotting delay for given supply voltage levels for Lvt, Nvt, and Hvt devices at a higher operating temperature than nominal operating temperature for the same Lvt, Nvt, and Hvt devices illustrated in the delay-supply voltage profiles 68 and 68' in FIGS. 4 and 5, respectively. The same types of axes and curves are illustrated in FIG. 6 as provided in FIGS. 4 and 5, but are shown with appended element numbers (") to signify that the axes and curve data are for a different operating temperature. Just as illustrated in the delay-supply voltage profiles in FIGS. 4 and 5, the delay supply voltage profiles in FIG. 6 illustrate that lowering the supply voltage amplitude for the Lvt devices increases propagation delay even though leakage current is reduced. As illustrated, the propagation delays for the Vt cells are less at a higher operating temperature than at the lower operating temperature, as illustrated in FIG. 5, for a given supply voltage.

Figure 3:
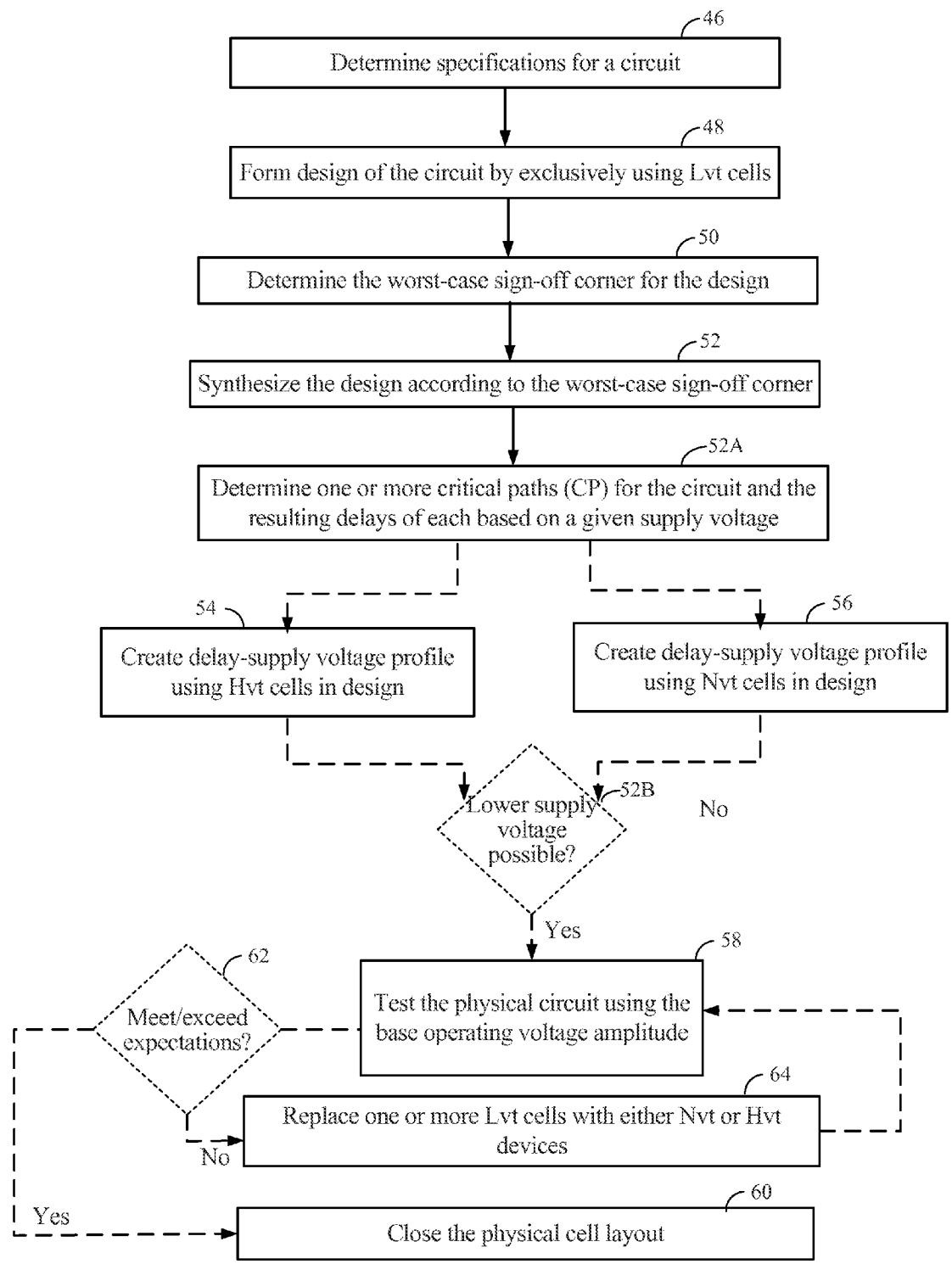
FIG. 3 is a flowchart illustrating an exemplary process for providing a design and physical layout for a circuit or functional block employing one or more lower Vt (Lvt) cells powered by a determined based supply voltage level to optimize performance and power consumption of the circuit design and circuit.
Figure 4:
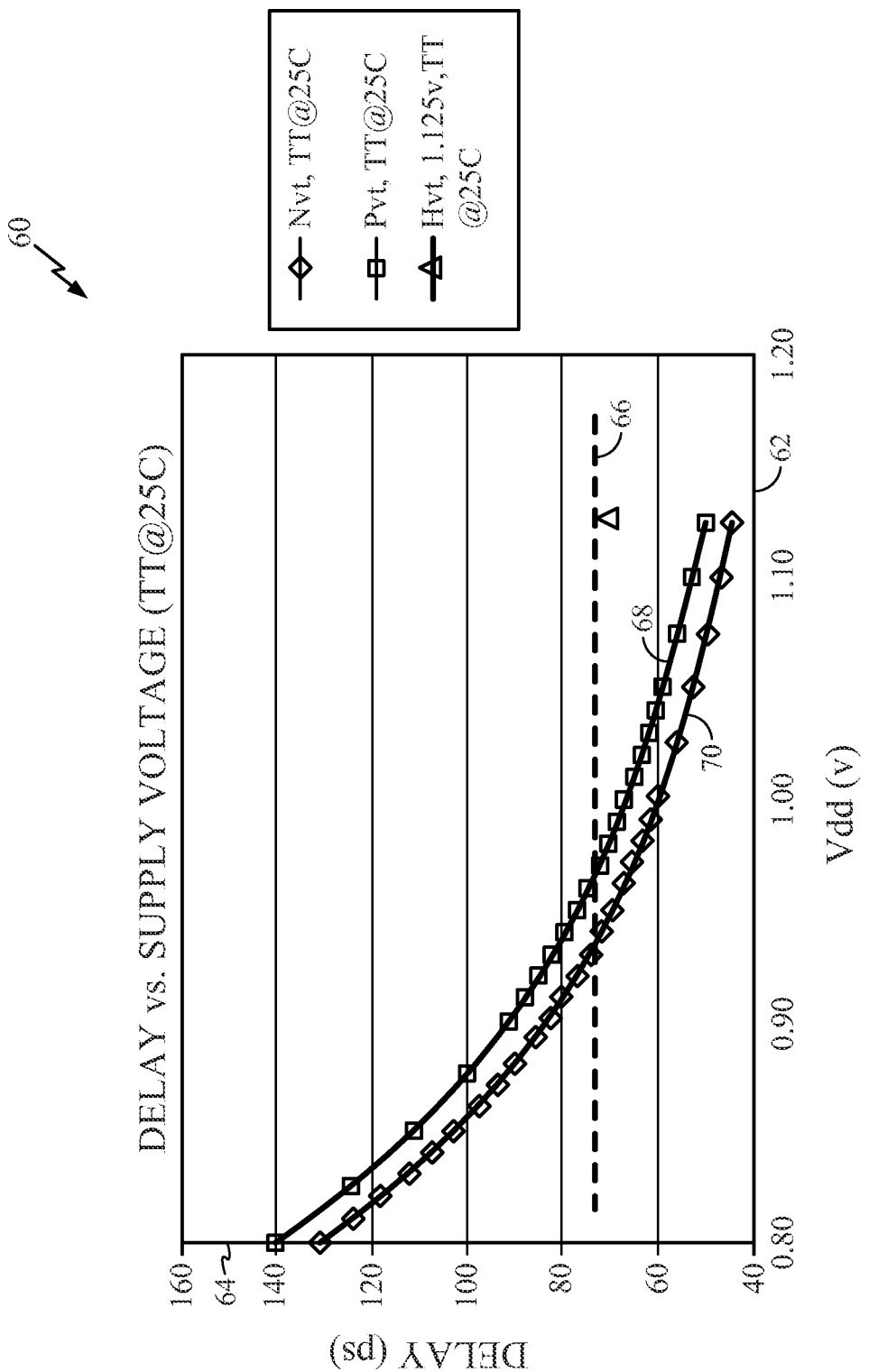
FIG. 4 is an exemplary delay-supply voltage profile plotting delay for given supply voltages at a nominal operating temperature for exemplary Lvt, Hvt, and nominal Vt (Nvt) devices.
Figure 5:
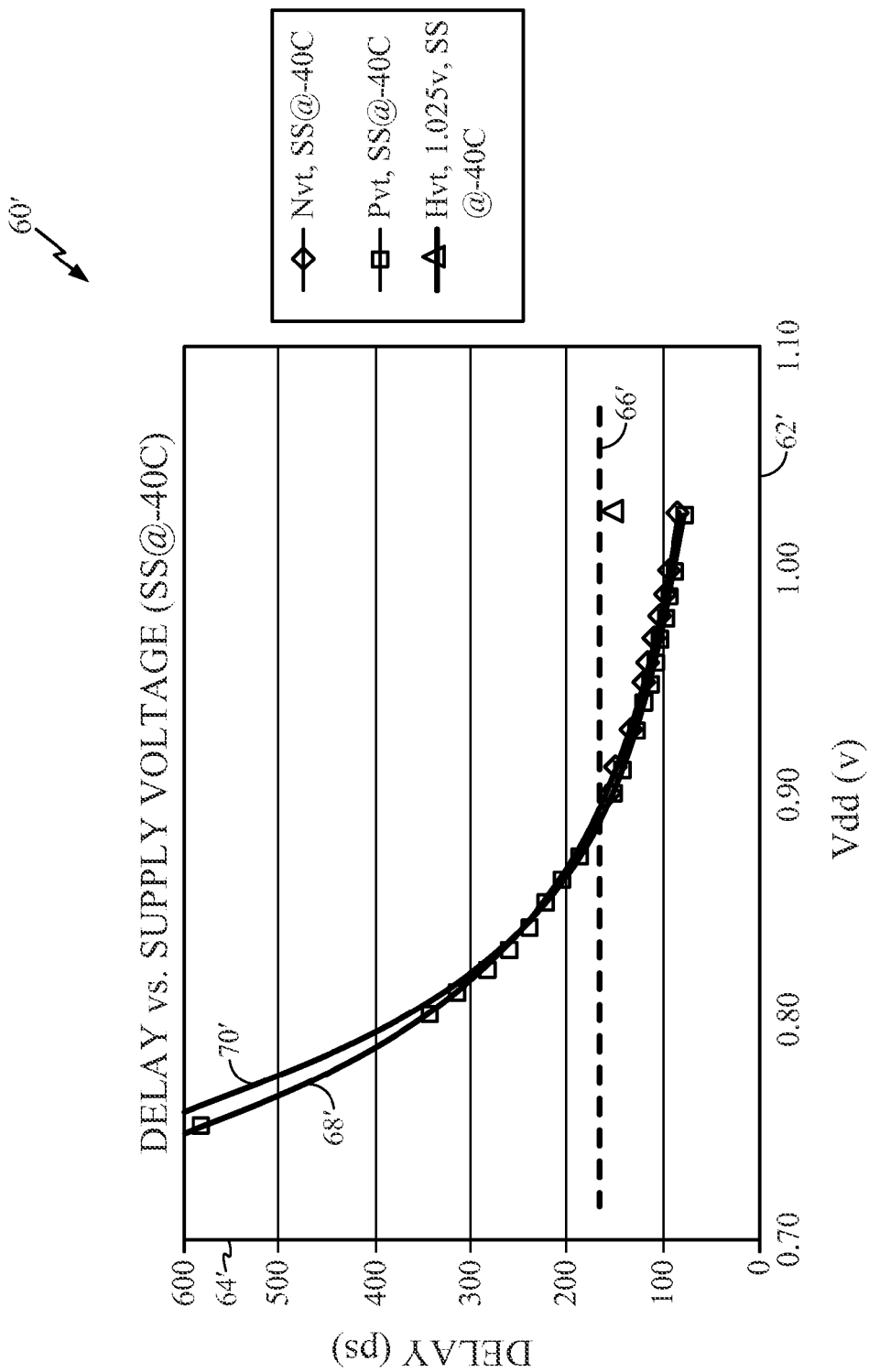
FIG. 5 is an exemplary delay-supply voltage profile plotting delay for given supply voltages at a lower operating temperature for exemplary Lvt, Hvt, and Nvt devices.
Figure 6:
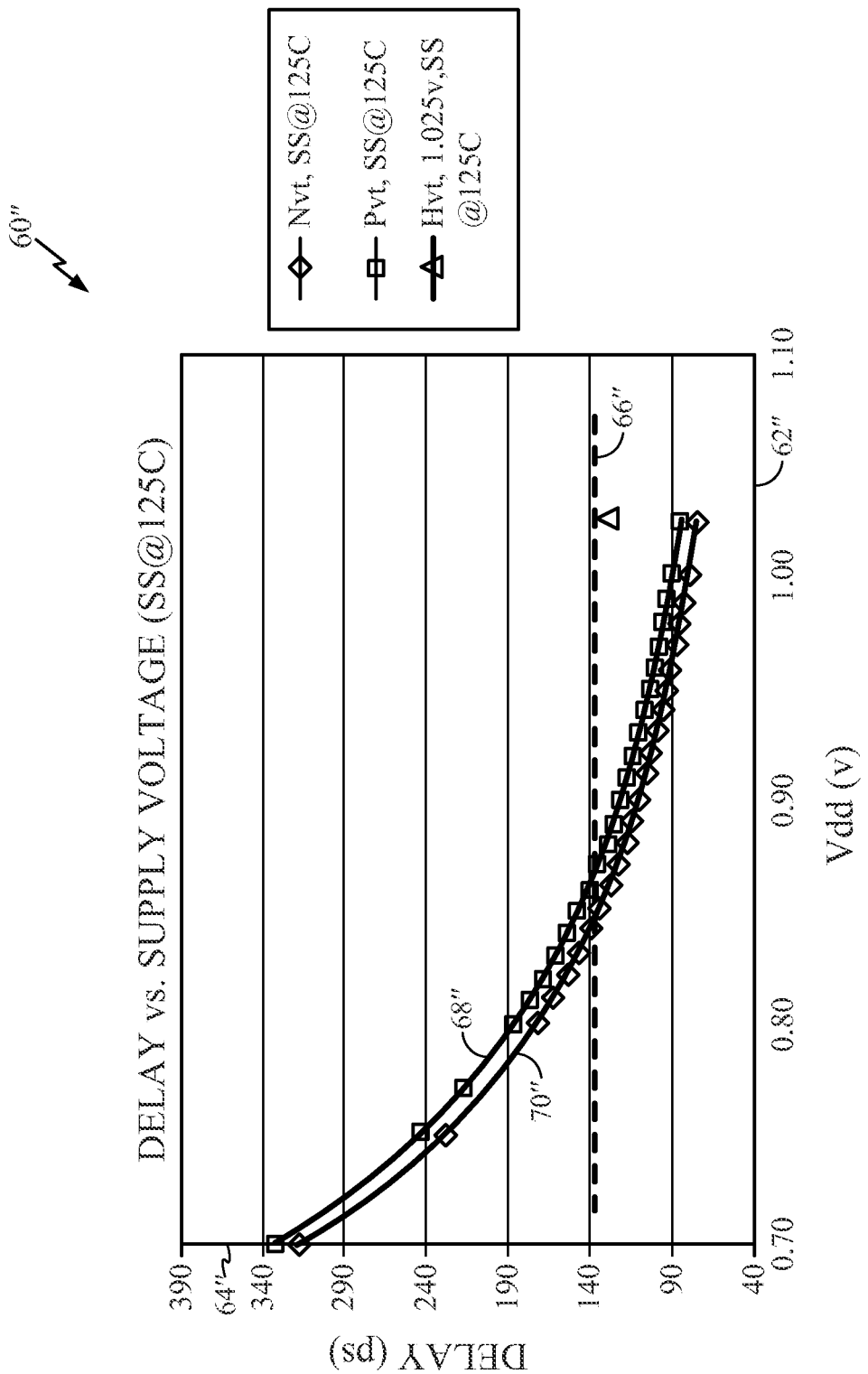
FIG. 6 is an exemplary delay-supply voltage profile plotting delay for given supply voltages at a higher operating temperature for exemplary Lvt, Hvt, and Nvt devices.

Once the base supply voltage amplitude is determined based on an analysis of the performance of the circuit, such as according to the one or more of the delay-supply voltage profiles illustrated in FIG. 4-6, the physical circuit can be tested using the base operating voltage amplitude (block 58, FIG. 3). If the physical circuit meets or exceeds operating performance and leakage power specifications, the physical cell layout of the circuit can be closed (block 60, FIG. 3). From there, a base supply voltage rail in the physical cell layout of the circuit to supply a voltage level of a base supply voltage amplitude to the cells for their operation can be provided, and the process finishes. However, if the physical circuit operating at the base operating voltage amplitude does not meet or exceed operating performance and leakage power specifications (block 62, FIG. 3), one or more of the Lvt devices in the circuit can be replaced with either an Nvt or Hvt device(s) to reduce leakage power while still meeting or exceeding performance specifications and provide a multi Vt cell design (block 64, FIG. 3). This may be particularly possible for the non-CPs of the circuit where swapping one or more Lvt device(s) with one or more Nvt and/or Hvt devices may not affect the circuit meeting or exceeding performance specifications. The process of physically building and testing the circuit with a multi Vt device design is repeated until the circuit meets or exceeds performance and leakage specifications according to the base supply voltage amplitude (blocks 58-64).

Figure 7:
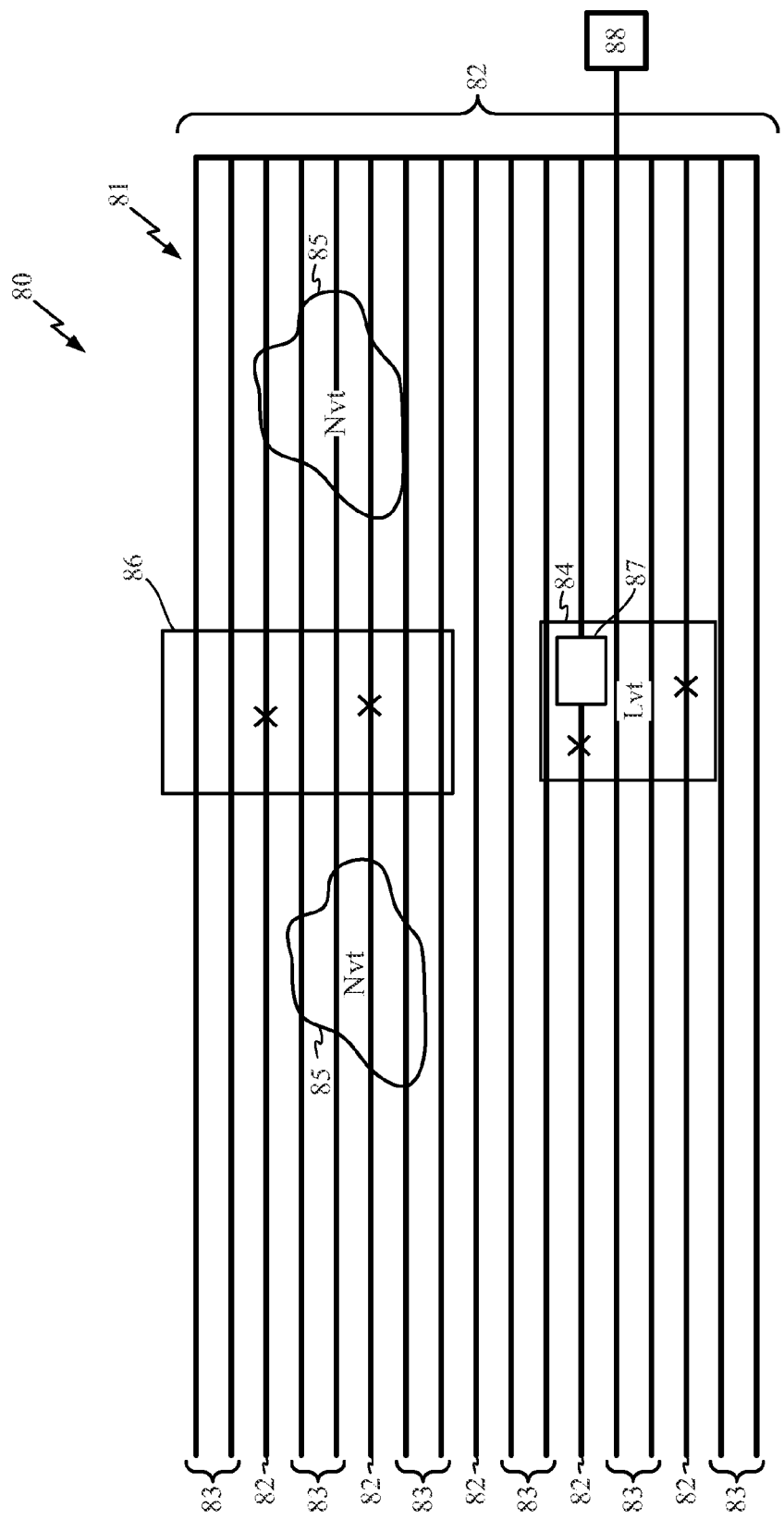
FIG. 7 is a diagram of an exemplary circuit providing a single power grid for powering a circuit employing one or more Vt devices powered at a base supply voltage level to optimize performance and power consumption of the circuit.

FIG. 7 illustrates an exemplary circuit layout employing multi Vt devices that may be performed using the methods and techniques described above. As illustrated, a circuit layout 80 is provided. The circuit layout 80 includes a single power grid 81 comprised of a plurality of supply voltage rails 82 each providing a voltage level at the base supply voltage amplitude as the nominal voltage level. Various cell-based devices, including Lvt and Hvt cells, are included in the circuit layout 80. For example, Lvt devices 84, Nvt devices 85, and memory cells 86 may be provided. The memory cells may be an Lvt, Nvt, or Hvt device. The Lvt device 84 is shown as having a custom circuit block 87. The supply voltage rails 82 are provided in the circuit layout 80 to be of a base supply voltage rail to supply a voltage level at a base supply voltage amplitude to the cells, as previously described, to optimize performance and power consumption of the circuit accomplished by the circuit layout 80. The base supply voltage amplitude is selected according to the above described techniques and is provided of a sufficient amplitude for the Lvt devices 84, Nvt devices 85, and memory cells 86 to properly operate.

Thus far, the methodology and techniques described above may be used to provide a static base supply voltage amplitude (e.g., the nominal supply voltage rail 82 in FIG. 7) based on an average operating scenario. However, other techniques can be used to further increase performance or conserve power of a circuit, including but not limited to the circuit layout 80 illustrated in FIG. 7. For example, dynamic voltage scaling (DVS) using a dynamic voltage scaler 88 can be employed to either increase active performance or lower active power consumption. DVS can be used to either scale-up (i.e., increase) or scale-down (i.e., decrease) the voltage level supplied to the base supply voltage rail, such as the base supply voltage rails 82 illustrated in the exemplary circuit layout 80 of FIG. 7. Increasing the voltage level to operate an Lvt cell from the nominal or base supply voltage level typically reduces delay propagation in the Lvt cells, as illustrated in the delay-supply voltage profiles in FIGS. 3-5 for example. Reducing delay increases performance or speed of the circuit. This is also known as "hyper-performance." Hyper-performance would normally increase leakage current in the Lvt cells if used to power the Lvt cells during standby modes, but hyper-performance may only be used during active modes where leakage current is not of concern. The tradeoff for hyper-performance will be higher active power consumption, but the active power consumption can be less than it otherwise would have been by using providing the base supply voltage level to power the circuit. A reduction in operating voltage results in quadratic reduction in active power.

DVS can also be used to decrease voltage to conserve active power consumption of a circuit to in turn reduce total power consumption of a circuit, but performance may also be reduced. This allows for power consumption modes, where performance can be traded off against increased power consumption during active modes. DVS can also be used to decrease voltage during non-active modes to reduce standby power consumption. A lower supply voltage level lowers power consumed. For example, a sleep mode may be provided where DVS can be used to scale down the voltage level supplied to the cells to a lower voltage level during standby to conserve power. The voltage supply could also be collapsed using a Global Distributed Foot Switching (GDFS) power switch collapse or a full power rail collapse to ground to reduce voltage levels to conserve power. Clamps may be provided in the circuit layout 80 and coupled to the memory cell 86 to prevent the memory cell 86 from providing an indeterminable output during a power rail collapse. However, if it is desired for the memory cell 86 or any other cell requiring a minimum operating voltage to continue normal operation during a power collapse or when the base supply voltage amplitude is scaled down below the minimum operating voltage, a multiple rail power grid may be employed. Each rail in the multiple rail power grid is configured to provide one or more additional independent voltage power supplies. For example, a dual rail power grid can provide a second voltage rail powered by an independent second voltage power supply to power cells independent of the base voltage supply. In this manner, the base supply voltage rail powered by the base supply voltage can be scaled or collapsed without affecting cells powered by the second voltage power rail. A dual rail power grid power supply embodiment is described later in this application in FIGS. 8-11.

Dynamic frequency scaling (DFS) using a dynamic frequency scaler can also be employed to either increase active performance or lower power consumption. DFS is another method to provide hyper-performance or power consumption in a circuit. Similar to DVS, an increase in the clock speed of a clock signal in the circuit results in increased operating speed of a circuit to provide hyper-performance. However, an increase in clock speed also results in an increase in active power consumption in a circuit, and thus an increase in total power consumption in a circuit. A tradeoff in increased active power consumption may be acceptable for hyper-performance. However, the active power consumption can be less than it otherwise would have been by using the base supply voltage level to power the circuit. A reduction in operating voltage results in quadratic reduction in active power. Likewise, a decrease in clock speed and thus operating speed of a circuit may be acceptable for a reduction in active power consumption. Circuits often allow for both DVS and DFS for hyper-performance or power consumption modes, where performance can be traded off against power consumption. Combined DVS and DFS in a circuit is also known as "dynamic voltage and frequency scaling" (DVFS).

Figure 8:
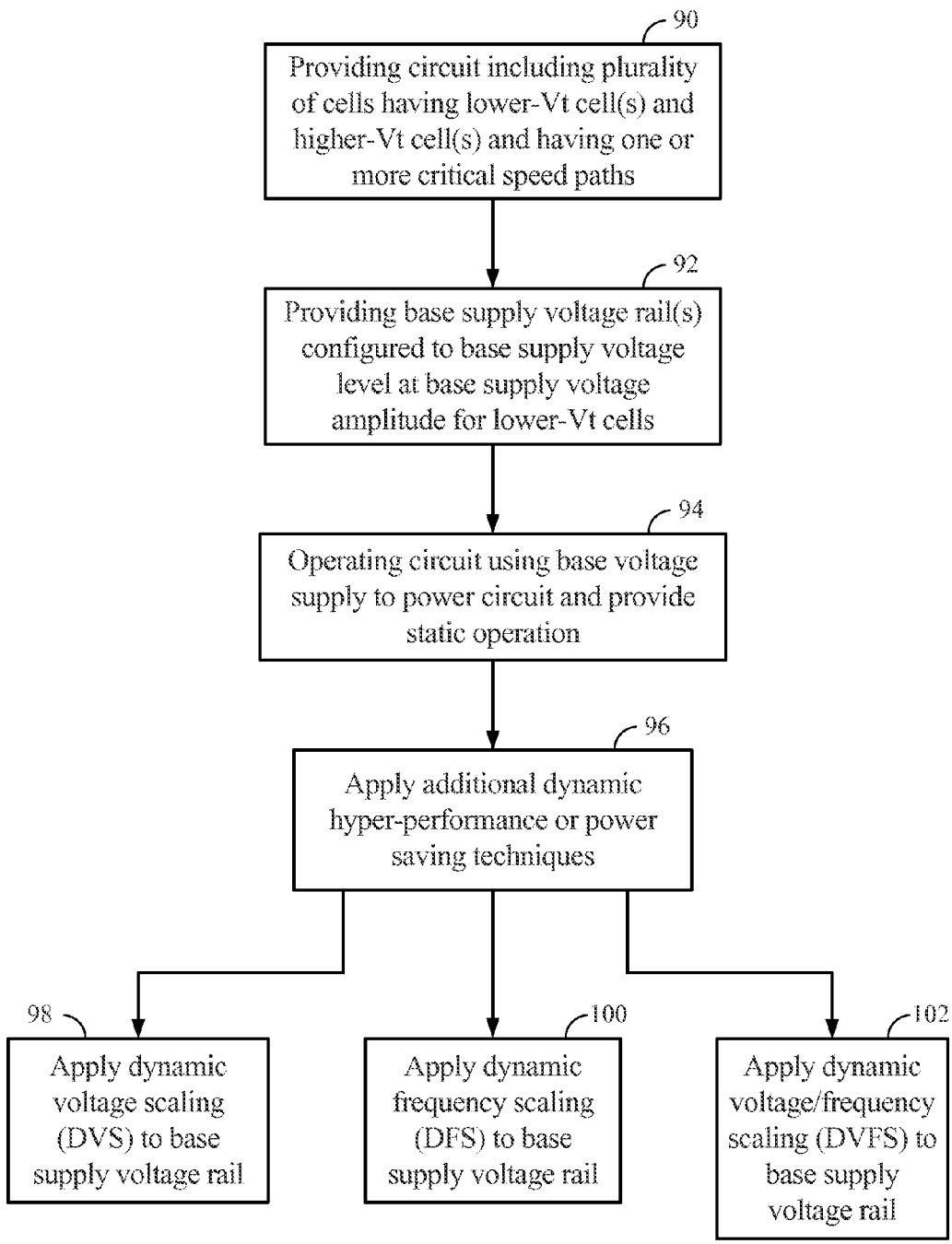
FIG. 8 is a flowchart illustrating operation of a circuit employing one or more Lvt cells having optimized performance and power consumption.

In this regard, FIG. 8 is a flowchart that illustrates an exemplary process for providing and operating a circuit according to a layout provided by employing the methodologies and techniques described above for optimizing operating speed and power consumption of a circuit. The process also provides for the ability to allow either additional active hyper-performance and/or power consumption modes for additional active performance and power consumption optimization. The process starts by providing a circuit that includes a plurality of cells, which may include one or more Lvt cells and one or more Hvt cells, and having one or more CPs (block 90). Next, a base supply voltage is provided, which is configured to provide a voltage level at the determined base supply voltage amplitude for the cells (block 92). Thereafter, the circuit is operated by using the base supply voltage to power the circuit (block 94). This provides the static operation for the circuit.

As previously described, additional hyper-performance and/or power consumption conversation techniques may be employed dynamically during active mode(s) (block 96). For example, DVS may be employed to scale the voltage supplied to the base supply voltage rail to power the circuit to either increase performance or reduce power consumption in active mode(s) (block 98). Scaling up the voltage level increases active performance. Scaling down the voltage level reduces active power consumption thereby reducing total power consumption by a circuit. Alternatively, DFS may be provided to the circuit by either scaling up or down the clock speed of the circuit as previously described (block 100). Or, DVFS may be employed to provide both dynamic voltage and frequency scaling (block 102), as previously described.

Figure 9:
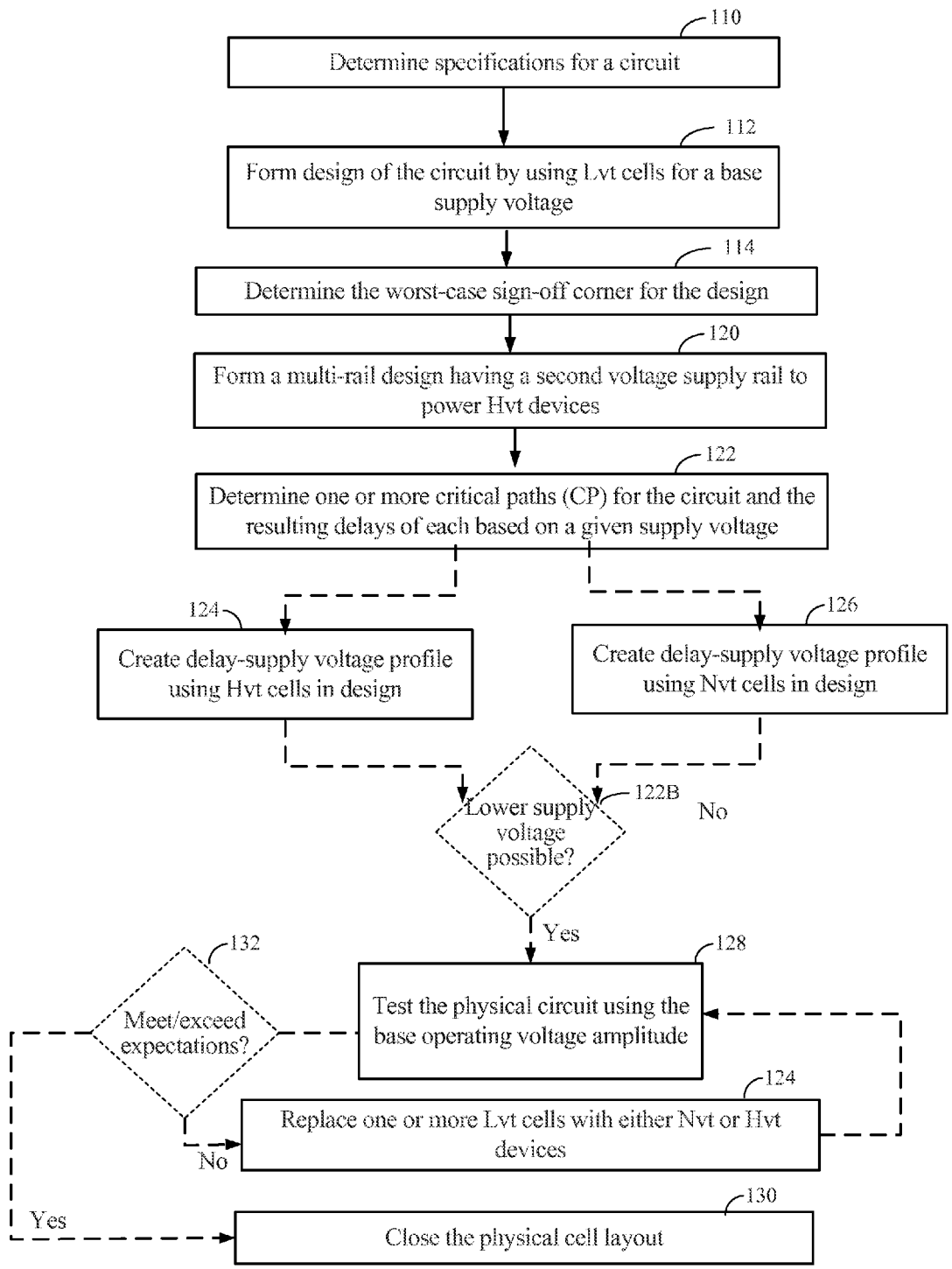
FIG. 9 is a flowchart illustrating an exemplary process for providing a design and physical layout for a circuit employing a multiple rail power grid and employing multi Vt devices to optimize performance and power consumption of the circuit layout and circuit.

Another embodiment of providing a circuit layout to optimize performance and power consumption for a circuit is provided in the flowchart illustrated in FIG. 9. This method involves providing a split power grid employing at least two supply voltage levels from at least two voltage supplies. The different voltage supplies can be designed and used to provide operating power at two different supply voltages in the circuit. One voltage supply is provided as the base supply voltage for providing a low base voltage for operating an Lvt cell(s) to optimize power consumption as previously described. The base supply voltage can be scaled using DVS, DFS, or DVFS, if desired. Further, a second supply voltage rail is provided to supply a second voltage level independent from the base supply voltage rail and can be scaled similarly. A second supply voltage rail may be provided to provide power to any cells that require a minimum supply voltage for cell stability such that scaling techniques may not be possible if only the base supply voltage rail were provided. Examples include memory cells, analog mix-signal devices, and functional blocks which need voltage head-room. In this instance, the second supply voltage rail can be provided to independently power cells that require a minimum voltage supply for stability or other reasons. This allows the base supply voltage rail to independently power other cells that do not require minimum voltages and thus can be lowered in the static design to optimize performance and power consumption as well as dynamically scaled for power consumption without concern for stability, as previously discussed. Providing a split power grid may allow voltage scaling of the base supply voltage in dynamic or standby modes and/or collapse of the base supply voltage in standby modes to further reduce power consumption, while maintaining the voltage supply for cells having minimum voltage requirements for stability.

For example, memory cells that retain data based on electric fields require a minimum power lower at all times to retain data. An example of such a memory cell is static random access memory (SRAM). Providing a split power grid may be necessary if SRAM is employed in the circuit layout and circuit. On the other hand, if magnetic random access memory (MRAM) cells are employed for memory in the circuit layout and circuit, a split power grid may not be necessary. This is because MRAM cells store data using a magnetic field that does not require a minimum voltage level or power to retain data.

In this regard, as illustrated in FIG. 9, the initial tasks for design and building a multi-rail circuit design and circuit (blocks 110-114) are the same as the initial tasks in the process of FIG. 3 (blocks 46-50), except that the Lvt device selections are for a base voltage supply rail. A multi-rail design is employed having a second voltage supply rail to power Hvt devices (block 120). The remainder of the process (blocks 122-132) remains the same as previously discussed in the process in FIG. 3 (blocks 52-64) to determine an acceptable base supply voltage amplitude for powering devices coupled to the base voltage supply rail.

Figure 10:
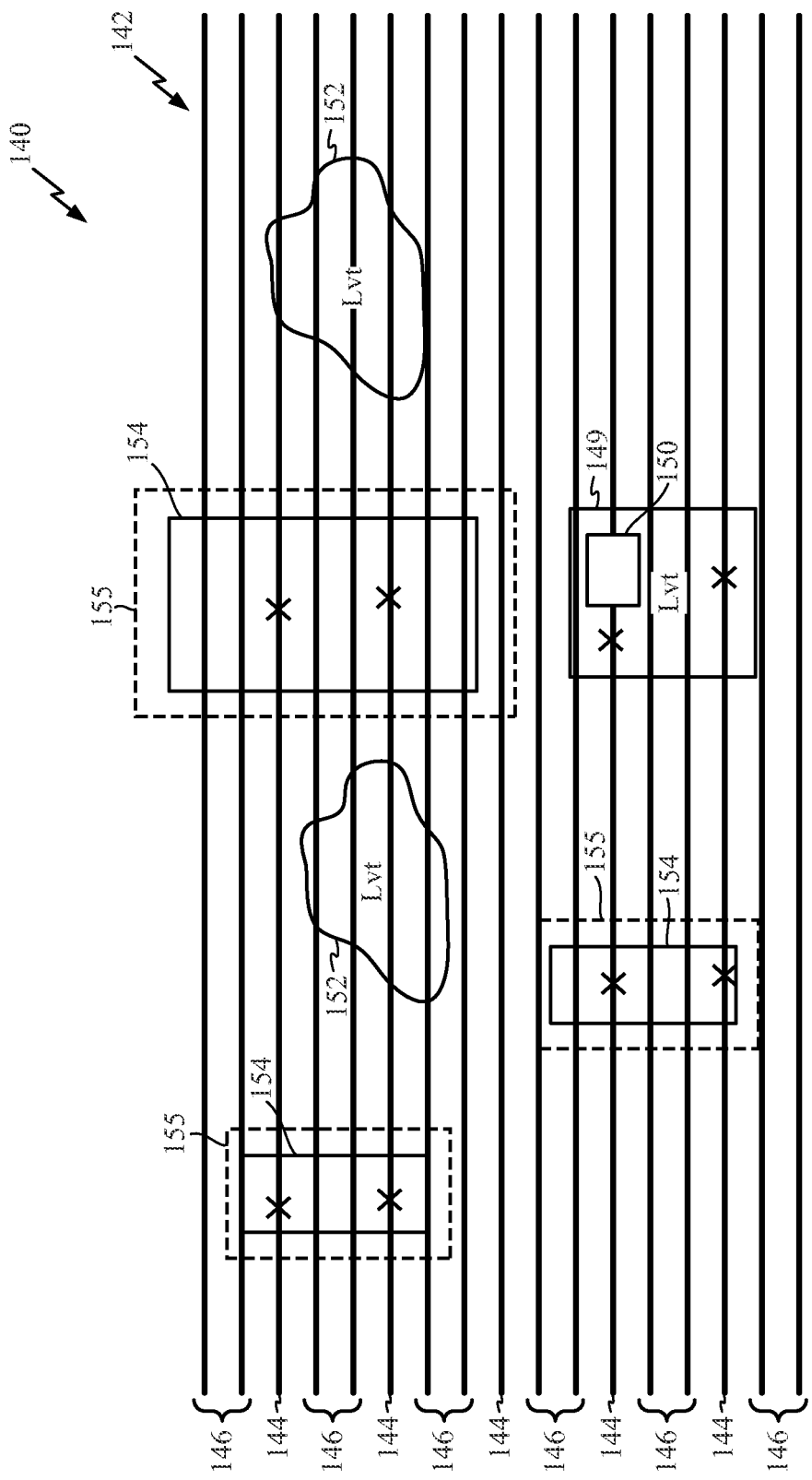
FIG. 10 is a diagram of an exemplary circuit providing a split power grid for powering mixed multi Vt devices at a base supply voltage level and a second supply voltage level to optimize performance and power consumption of the circuit layout and circuit.

In this regard, FIG. 10 illustrates an exemplary circuit layout employing multiVt devices with a dual rail power grid that may be performed using the methods and techniques described above. As illustrated, a circuit layout 140 is provided. The circuit layout 140 includes a dual rail power grid 142 comprised of a plurality of base supply voltage rails 144 supplied by the base voltage supply at a voltage level of the base supply voltage amplitude. The base supply voltage rails 144 are used to provide power to Lvt devices, or a combination of Lvt, Nvt, and/or Hvt devices to provide optimized performance and power consumption as previously discussed. Ground rails 146 are provided to power cells. A plurality of second supply voltage rails 146 is also provided to supply voltage at a second voltage level independent from the base supply voltage rails 144. In this manner, as previously discussed, cells requiring minimum voltage level for stability or other reasons can be powered by the second supply voltage rails 148 so that power collapse or scaling can be performed to the base supply voltage rails 144 without affecting the voltage level provided by the second supply voltage rails 146. The second voltage level provided to the second supply voltage rail 146 may be the same or different voltage level than provided to the base supply voltage rail 144. Note that although the circuit layout 140 only provides two supply voltage rails 144, 146, more than two supply voltage rails could be provided.

Various cell-based devices, including Lvt and Hvt cells, are included in the circuit layout 140. For example, Lvt devices 149, 152 and memory cells 154 may be provided. A custom circuit block 150 may be provided in the Lvt device 149. In this example, the memory cells 154 are Hvt devices powered by the second supply voltage rail 146 so the base supply voltage amplitude provided to the base supply voltage rail 144 does not affect the operation of the memory cells 154. In this manner, a lower base voltage supply amplitude may be able to be provided than would otherwise be possible if the memory cells 154 were powered by the base supply voltage rail 144 to further optimize performance. Level shifting circuitry 155 is provided to the memory cells 154 so that signals communicated from devices powered by the first supply voltage rail 144 to the memory cells 154 are level shifted. The base supply voltage rails 144 and second supply voltage rails 146 may be provided so that any of the cells 149, 152, 154 can be powered from either rail 144, 146, as desired. However, at least one of the Lvt devices should be powered from the base supply voltage rail 144 to optimize performance and power consumption of the circuit layout 140 according to the methodologies and techniques discussed herein. Again, clamps may be provided in the circuit layout 140 so that the memory cells 154 do not provide an indeterminable output during a collapse of the second supply voltage rail 146.

Figure 11:
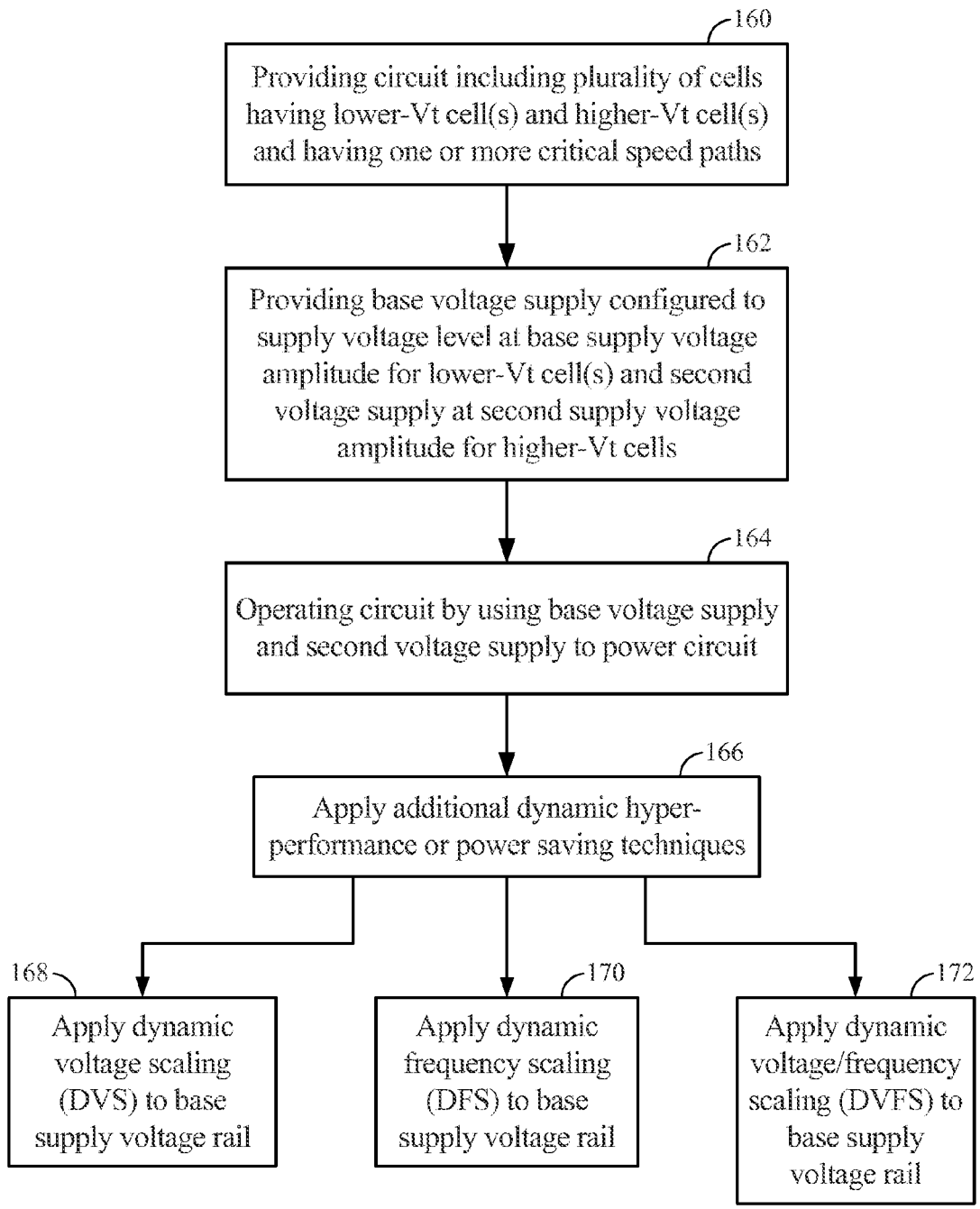
FIG. 11 is a flowchart illustrating operation of a circuit employing a split power grid for powering multi Vt devices having optimized performance and power consumption.

In this regard, FIG. 11 is a flowchart that illustrates an exemplary process for providing and operating a circuit having a dual rail power grid according to a layout provided by employing the methodologies and techniques described above for optimizing operating speed and power consumption of a circuit. However, note that more than two power grids may be provided. The process also provides for the ability to allow either additional active hyper-performance and/or power consumption modes for additional active performance and power consumption optimization. The process starts by providing a circuit that includes a plurality of cells that may have one or more Lvt cells and one or more Hvt cells, and having one or more CPs (block 160). Next, a base supply voltage is provided, which is configured to provide a voltage level at the determined base supply voltage amplitude for the cells (block 162). A second voltage supply is also provided, which is configured to provide a voltage level at a second supply voltage amplitude for the cells (block 162). Thereafter, the circuit is operated by using the base voltage supply and the second voltage supply to power the circuit (block 164). This provides the static operation for the circuit employing a dual rail power grid.

As previously described, additional hyper-performance and/or power consumption conversation techniques may be employed dynamically during active mode(s) (block 166). For example, DVS may be employed to scale the voltage supplied to the base supply voltage rail to power the circuit to either increase performance or reduce power consumption in active mode(s) (block 168). Scaling up the voltage level increases active performance. Scaling down the voltage level reduces active power consumption thereby reducing total power consumption by a circuit. Alternatively, DFS may be provided to the circuit by either scaling up or down the clock speed of the circuit in any of the voltage supply rails, as previously described (block 170). Or, DVFS may be employed to provide both dynamic voltage and frequency scaling (block 172), as previously described.

It is noted that the operational tasks described in any of the exemplary embodiments herein are described to provide examples and discussion. The operations described may be performed in numerous different sequences other than the illustrated sequences. Furthermore, operations described in a single operational task may actually be performed in a number of different tasks. Additionally, one or more operational tasks discussed in the exemplary embodiments may be combined. It is to be understood that the operational tasks illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm tasks described in connection with the embodiments disclosed herein may be implemented as electronic hardware, computer software, or combinations of both. To illustrate this interchangeability of hardware and software, various illustrative components, blocks, modules, circuits, and tasks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The tasks of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Further, a circuit, circuits or functional blocks according to the designs and processes discussed herein may be included or integrated in a semiconductor die, integrated circuit, and/or device, including an electronic device. Examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for using one or more lower threshold voltage (Lvt) cells in a circuit, comprising:
   selecting, by a processor, based on target operating specifications of the circuit, one or more cells for the circuit to be Lvt cells;
   determining, by the processor, one or more operating temperature specifications for the circuit;
   determining, by the processor, a base supply voltage amplitude for providing power to the one or more Lvt cells as a function of a delay specification for the circuit using a delay-supply voltage profile for the circuit at the one or more operating temperature specifications, such that the base supply voltage amplitude corresponds to a low or lowest supply voltage to the Lvt cells that allows the circuit to meet a target operating speed;
   forming, by processor, a physical layout of the circuit using the one or more Lvt; and
   providing a base supply voltage rail in the physical layout of the circuit, wherein the base supply voltage rail is configured to supply a base supply voltage level at the base supply voltage amplitude from a base voltage supply to at least one of the one or more Lvt cells.

2. The method of claim 1, further comprising determining one or more specifications for the circuit.

3. The method of claim 2, wherein the one or more specifications include one or more specifications selected from the group consisting of a performance specification, a power consumption specification, and an area specification.

4. The method of claim 2, further comprising determining if the one or more specifications in the physical layout of the circuit are met or exceeded.

5. The method of claim 4, further comprising replacing at least one of the one or more Lvt cells with one or more nominal threshold voltage (Nvt) or higher threshold voltage (Hvt) devices for the circuit as a function of the determining if the one or more specifications in the physical layout of the circuit are met or exceeded.

6. The method of claim 5, further comprising repeating the replacing in an iterative fashion until it is determined that the one or more specifications in the physical layout for the circuit are met or exceeded.

7. The method of claim 5, further comprising replacing the one or more Lvt cells with one or more Nvt or Hvt devices in one or more critical paths in the circuit.

8. The method of claim 1, father comprising providing a dynamic voltage scaler (DVS) in the physical layout of the circuit configured to either scale up or scale down an amplitude of the base supply voltage level at the base supply voltage rail.

9. The method of claim 1 further comprising providing a dynamic frequency scaler (DES) in the physical layout of the circuit configured to scale a clock signal applied to at least one of the one or more Lvt cells.

10. The method of claim 1, further comprising providing a dynamic voltage frequency scaler (DVFS) in the physical layout of the circuit configured to scale the base supply voltage level at the base supply voltage rail and a clock signal applied to at least one of the one or more Lvt cells.

11. The method of claim 1, further comprising providing a voltage collapser in the physical layout of the circuit configured to collapse the base supply voltage level at the base supply voltage rail during a sleep mode.

12. The method of claim 1, further comprising providing a second supply voltage rail in the physical layout of the circuit configured to supply a second supply voltage level at a second supply voltage amplitude from a second voltage supply independent of the base supply voltage rail.

13. The method of claim 12, wherein providing the second supply voltage rail further comprises configuring the second supply voltage rail to receive and provide power from the second voltage supply to one or more nominal threshold voltage (Nvt) or higher threshold voltage (Hvt) cells.

14. The method of claim 13, further comprising providing a dynamic voltage scaler (DVS) in the physical layout of the circuit configured to either scale up or scale down the base supply voltage level, the second supply voltage level, or both the base supply voltage level and the second supply voltage level.

15. A method for using one or more lower threshold voltage (Lvt) cells in a circuit, comprising:
   step for selecting, by a processor, based on target operating specifications of the circuit, one or more cells for the circuit to be Lvt cells;
   step for determining, by the processor, one or more operating temperature specifications for the circuit;
   step for determining, by the processor, a base supply voltage amplitude for providing power to the one or more Lvt cells as a function of a delay specification for the circuit using a delay-supply voltage profile for the circuit at the one or more operating temperature specifications, such that the base supply voltage amplitude corresponds to a low or lowest supply voltage to the Lvt cells that allows the circuit to meet a target operating speed;
   step for forming a physical layout of the circuit using the one or more Lvt cells; and
   step for providing a base supply voltage rail in the physical layout of the circuit, wherein the base supply voltage rail is configured to supply a base supply voltage level at the base supply voltage amplitude from a base voltage supply to at least one of the one or more Lvt cells.

16. A method of managing power consumption in a circuit, comprising:
   providing, by a processor, a physical layout of a circuit one or more lower threshold voltage (Lvt) cells;
   determining, by the processor, one or more operating temperature specifications for the circuit; and
   operating the circuit by providing power to the one or more Lvt cells by:
   supplying a base supply voltage level of a base supply voltage amplitude from a base voltage supply to a base supply voltage rail coupled to at least one of the one or more Lvt cells;
   wherein the base supply voltage amplitude is a function of a delay specification for the circuit using a delay-supply voltage profile for the at least one of the one or more Lvt cells at the one or more operating temperature specifications, such that the base supply voltage amplitude corresponds to a low or lowest supply voltage to the Lvt cells that allows the circuit to meet a target operating speed.

17. The method of claim 16, wherein supplying the base supply voltage level comprises supplying the base supply voltage level to all of the one or more Lvt cells.

18. The method of claim 16, wherein operating the circuit further comprises dynamically scaling the base supply voltage level either up or down in amplitude.

19. The method of claim 16, wherein operating the circuit further comprises dynamically scaling a clock signal applied to at least one of the one or more Lvt cells.

20. The method of claim 16, wherein operating the circuit further comprises collapsing the base supply voltage level.

21. The method of claim 16, wherein operating the circuit further comprises supplying a second supply voltage level of a second supply voltage amplitude from a second voltage supply to a second supply voltage rail coupled to at least one of one or more nominal threshold voltage (Nvt) or higher threshold voltage (Hvt) cells provided in the circuit.

22. The method of claim 21, wherein operating the circuit further comprises dynamically scaling the second supply voltage level either up or down in amplitude.

23. A circuit, comprising:
one or more lower threshold voltage (Lvt) cells;
a base supply voltage rail coupled to at least one of the one or more Lvt cells; and
a base voltage supply configured to supply a base supply voltage level of a base supply voltage amplitude to the base supply voltage rail,
wherein the base supply voltage amplitude is based on a function of a delay specification for the circuit using a delay-supply voltage profile for the circuit at one or more operating temperature specifications for the circuit, such that the base supply voltage amplitude corresponds to a low or lowest supply voltage to the Lvt cells that allows the circuit to meet a target operating speed.

24. The circuit of claim 23, wherein the base supply voltage rail is coupled to all of the one or more Lvt cells.

25. The circuit of claim 23, further comprising a dynamic voltage scaler (DVS) configured to dynamically either scale up or scale down an amplitude of the base supply voltage level.

26. The circuit of claim. 23, further comprising a dynamic frequency scaler (DFS) configured to dynamically scale a clock signal applied to at least one of the one or more Lvt cells.

27. The circuit of claim 23, further comprising a voltage collapser configured to collapse the base supply voltage level.

28. The circuit of claim 23, further comprising:
a second supply voltage rail coupled to at least one of one or more nominal threshold voltage (Nvt) or higher threshold voltage (Hvt) cells provided in the circuit; and
a second voltage supply configured to supply a second supply voltage level to the second supply voltage rail independent of the base voltage supply.

29. The circuit of claim 28, further comprising a dynamic voltage scaler (DVS) configured to dynamically either scale up or scale down the amplitude of the second supply voltage level.

30. The circuit of claim 23 integrated in at least one semiconductor die.

31. The circuit of claim 23, further comprising a device, selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the circuit is integrated.

32. A circuit, comprising:
one or more lower threshold voltage (Lvt) cells;
a base supply voltage rail coupled to at least one of the one or more Lvt cells; and
means for providing a base supply voltage level of a base supply voltage amplitude to the base supply voltage rail as a function of a delay specification for the circuit using a delay-supply voltage profile for the circuit at one or more operating temperature specifications for the circuit, wherein the base supply voltage amplitude is determined such that the base supply voltage amplitude corresponds to a low or lowest supply voltage to the Lvt cells that allows the circuit to meet a target operating speed.

* * * * *